United States Patent
Brooks et al.

(10) Patent No.: US 11,102,022 B2
(45) Date of Patent: Aug. 24, 2021

(54) CONFERENCING ENVIRONMENT MONITORING

(71) Applicant: Hewlett-Packard Development Company, L.P., Spring, TX (US)

(72) Inventors: Robert C Brooks, Spring, TX (US); Daniel James Braden, Spring, TX (US); Ronald E Deluga, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/762,473

(22) PCT Filed: Nov. 10, 2017

(86) PCT No.: PCT/US2017/061072
§ 371 (c)(1),
(2) Date: May 7, 2020

(87) PCT Pub. No.: WO2019/094027
PCT Pub. Date: May 16, 2019

(65) Prior Publication Data
US 2020/0351112 A1    Nov. 5, 2020

(51) Int. Cl.
*H04L 12/18* (2006.01)
*H04L 29/06* (2006.01)
(Continued)

(52) U.S. Cl.
CPC ...... *H04L 12/1827* (2013.01); *H04L 12/1822* (2013.01); *H04L 12/1831* (2013.01);
(Continued)

(58) Field of Classification Search
CPC ............ H04L 12/1813; H04L 12/1827; H04L 12/1831; H04L 12/1863–1895;
(Continued)

(56) References Cited

U.S. PATENT DOCUMENTS

| 8,130,256 B2 | 3/2012 | Trachtenberg et al. |
| 8,515,041 B2 * | 8/2013 | Byrne ................ H04M 3/568 |
| | | 379/202.01 |

(Continued)

FOREIGN PATENT DOCUMENTS

| EP | 1868348 B1 | 11/2010 |
| EP | 2814244 A1 | 12/2014 |

OTHER PUBLICATIONS

Technology to Determine the Positions of People and Detect a Speaker, 2015, https://www.fujixerox.com/eng/company/technology/communication/human/location.html.

*Primary Examiner* — Brendan Y Higa
(74) *Attorney, Agent, or Firm* — Brooks Cameron & Huebsch

(57) ABSTRACT

Example implementations relate to conferencing environment monitoring. An example monitoring device can include a processor to monitor a physical aspect and an audio aspect of a conferencing environment in which a conferencing device is located, wherein the conferencing device is communicatively coupled to the monitoring device. The monitoring device can detect, based on the monitoring, an issue impacting a conferencing session associated with the conferencing device and the conferencing environment. In response to the detection, the monitoring device can determine a correction for the issue and perform the correction.

16 Claims, 4 Drawing Sheets

(51) Int. Cl.
*H04N 7/15* (2006.01)
*H04M 3/56* (2006.01)

(52) U.S. Cl.
CPC ............ *H04L 65/80* (2013.01); *H04M 3/568* (2013.01); *H04N 7/15* (2013.01)

(58) Field of Classification Search
CPC ......... H04L 41/06–069; H04L 41/5087; H04L 43/04–0067; H04L 43/0823–0894; H04L 65/80; H04N 7/147; H04N 7/15; H04M 3/08; H04M 3/24; H04M 3/563; H04M 3/567–568; H04M 2250/12
See application file for complete search history.

(56) References Cited

U.S. PATENT DOCUMENTS

| | | | | |
|---|---|---|---|---|
| 8,666,049 | B2* | 3/2014 | Beerse | ................ H04M 3/2227 379/202.01 |
| 9,622,009 | B2 | 4/2017 | Robinson et al. | |
| 9,917,945 | B2* | 3/2018 | Kim | .................... H04M 3/2236 |
| 10,264,214 | B1* | 4/2019 | Kumar | .................... H04M 3/28 |
| 2005/0213517 | A1 | 9/2005 | Rodman | |
| 2009/0164575 | A1 | 6/2009 | Barbeau et al. | |
| 2009/0204922 | A1* | 8/2009 | Bhattacharjee | ..... H04L 12/1827 715/771 |
| 2011/0149013 | A1 | 6/2011 | Khot | |
| 2012/0051533 | A1 | 3/2012 | Byrne | |
| 2012/0082304 | A1* | 4/2012 | Byrne | .................... H04M 3/568 379/202.01 |
| 2012/0308044 | A1* | 12/2012 | Vander Mey | ....... H04L 12/1822 381/104 |
| 2014/0168354 | A1* | 6/2014 | Clavel | ................ H04N 21/4788 348/14.09 |
| 2015/0149540 | A1* | 5/2015 | Barker | ................ H04L 12/1827 709/204 |
| 2015/0179186 | A1* | 6/2015 | Swierk | .................... G06F 3/165 704/276 |
| 2016/0337510 | A1 | 11/2016 | Li et al. | |
| 2018/0167581 | A1* | 6/2018 | Goesnar | ................ H04M 3/56 |
| 2019/0068389 | A1* | 2/2019 | Chitre | .................... H04L 51/18 |
| 2019/0164563 | A1* | 5/2019 | Volcker | ............... H04L 12/1827 |
| 2019/0189117 | A1* | 6/2019 | Kumar | .................... H04L 51/02 |
| 2020/0067723 | A1* | 2/2020 | Anders | ............... H04L 12/1827 |

* cited by examiner

CONFERENCING ENVIRONMENT MONITORING

BACKGROUND

A conferencing session can include a conference with participants in different locations linked by communications devices. For instance, teleconferencing sessions can be linked by telephones and computing conferencing sessions can be linked by computing devices. Some conferencing sessions can include a combination of communication devices linking conferencing sessions.

DETAILED DESCRIPTION

Figure 1:
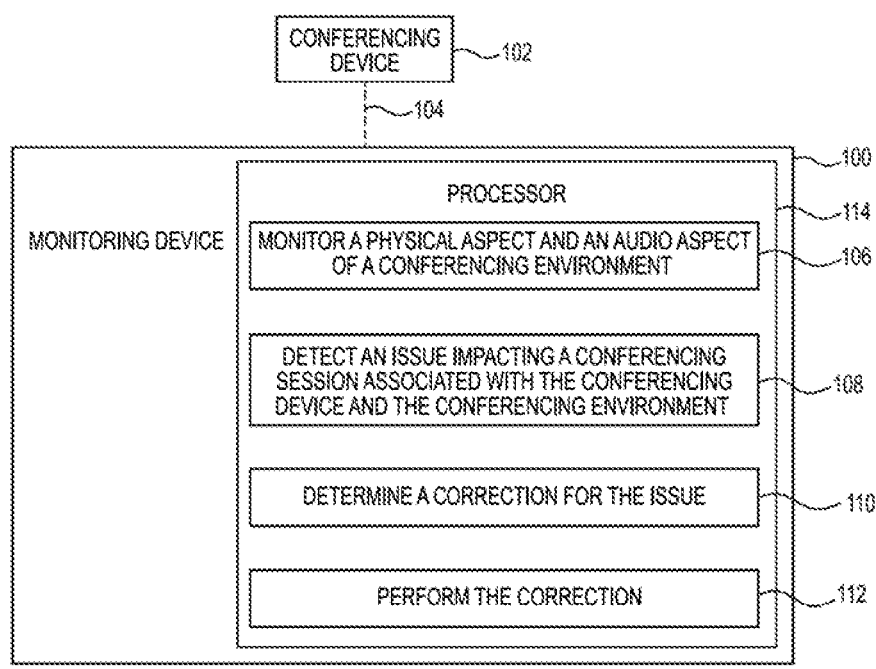
FIG. 1 illustrates a monitoring device to monitor a conferencing environment according to an example.

Conferencing sessions can be used within companies, between companies, and for client interactions, among others. Conferencing sessions can include a plurality of locations where each participant of the conferencing session is located. For instance, a first set of participants may be in a conference room around a conferencing device, while a second set of participants of the conferencing session may be in an office at a remote location surrounding a conferencing device. As used herein, a conferencing device can include a device over which the conferencing session takes place. For instance a conferencing device can include a landline telephone, a cellular telephone (e.g., smartphone), and/or a computing device such as a tablet, laptop, or personal computer, among others. In some examples, a conferencing session can include a plurality of different conferencing devices.

Quality and user experience of conferencing sessions can be impacted by a plurality of factors including locations of a conferencing device in a conferencing environment, objects obstructing the conference device, locations of participants in the conferencing environment, and/or blocked microphones on the conferencing device, among others. Such factors can negatively impact a conferencing session by causing issues for participants or equipment involved in the conferencing session. As used herein, an issue can include a problem, nuisance, or potential problem associated with the conferencing session due to the device configuration or conferencing environment.

Some approaches to addressing these issues include addressing incoming audio data at a monitoring or conferencing device to determine how to apply a voice processing model. Other approaches include evaluating incoming audio or visual data and providing error messages or disconnecting a conferencing session in response to a detected problem. Such approaches may include monitoring devices that lack capabilities to collect desired data (e.g., visual data from cameras, data from sensors, data from microphones, etc.) to monitor a conferencing session or environment and correct issues with the conferencing session or environment.

Similarly, such approaches may lack desired resources (e.g., fewer cameras, sensors, and/or microphones than desired), may have resources dedicated to something other than conferencing environment monitoring (e.g., camera dedicated to video conferencing and not conferencing environment monitoring), and/or may lack desired processing resources to analyze video, audio, or other data received during monitoring of the conferencing environment.

In contrast, examples of the present disclosure can include a monitoring device to monitor a conferencing environment and/or correct issues with a conferencing session and/or the conferencing environment. For instance, some examples can include a monitoring device communicatively coupled to sensors, cameras, microphones, and/or other data collection devices to monitor the conferencing environment, analyze the collected data, and/or detect and address issues of the conferencing environment and/or conferencing session. As used herein, "communicatively coupled" can include coupled via various wired and/or wireless connections between devices such that data can be transferred in various directions between the devices. The coupling need not be a direct connection, and in some examples can be an indirect connection.

As used herein, a conferencing environment can include an environment in which a conferencing session takes place. For instance, a conferencing environment can include a conference room, a business office, a coffee shop where a participant is located during the conferencing session, or a home office, among others. In some examples, the conferencing session can be part of the conferencing environment such that the conferencing environment includes the quality of the conferencing session and/or other aspects of the conferencing session. For instance, monitoring a conference environment such as a conference room can include monitoring the room and objects within the room, as well as a quality (e.g., sound, connection, etc.) of a conferencing session taking place in the conference room.

In some examples, an application can run on the monitoring device to facilitate communication between the monitoring device and a conferencing device and/or analyze the conferencing session (e.g., conferencing experience, call quality, etc.). Recommendations can be provided by the monitoring device to the conferencing device and/or a participant of the conferencing session to correct an issue.

FIG. 1 illustrates a monitoring device to monitor a conferencing environment according to an example. Monitoring device 100 can be a computing device in some examples. For example, monitoring device 100 can include a processor 114. Although the following descriptions refer to a single processor, the descriptions may also apply to a system with multiple processors.

Processor 114 can be a central processing unit (CPU), a semiconductor based microprocessor, and/or other hardware devices suitable for retrieval and execution of instructions stored in non-transitory machine readable medium. Processor 114 can fetch, decode, and execute instructions. As an alternative or in addition to retrieving and executing instructions, processor 114 can include at least one electronic circuit that includes electronic components for performing the functionality of instructions.

At 106, monitoring device 100 can comprise processor 114 to monitor a physical aspect and an audio aspect of a conferencing environment in which a conferencing device 102 is located. Conferencing device 102 can be communicatively coupled to monitoring device 100. In some examples, monitoring device 100 can be communicatively coupled to a sensor and/or a camera to monitor the physical aspect and the audio aspect. In some instances, a plurality of sensors and/or a plurality of cameras can be used. Monitoring device 100, in some instances, can be communicatively coupled to a microphone to monitor the audio aspect. In some examples, monitoring device 100 can be communicatively coupled to a plurality of microphones.

Monitoring device 100 can receive data from the camera(s), sensor(s), microphone(s), and/or other data collection devices, which can be located around the conferencing environment or directly connected to monitoring device 100 and/or conferencing device 102, for instance. The data can be received, stored, and/or analyzed at monitoring device 100. In some examples, monitoring device 100 can run an application to perform a portion of the monitoring.

Monitoring device 100 can monitor a conferencing environment for a plurality of visual, audio, thermal, and/or other aspects. For instance, aspects monitored by monitoring device 100 can include: an environment size; an environment shape; wall surface reflectivity; ceiling surface reflectivity; status of a door (e.g., opened/closed); a number of participants or others in the environment; a location of each of the participants or others in the environment; a position (e.g., standing, sitting, etc.) of each of the participants or others in the environment; a direction of a participant's voice with respect to the conferencing device 102 (e.g., participant speaking directly at the conferencing device 102, to the side of the conferencing device, away from the conferencing device 102, etc.); a number of active participants; a number of obstructions in the conferencing environment; a position of obstruction(s) in the conferencing environment; and/or a spatial relationship of obstruction(s) to the conferencing device 102 (e.g., a projector or laptop close to the conferencing device 102), among others.

At 108, monitoring device 100 can comprise processor 114 to detect an issue impacting a conferencing session associated with the conferencing device and the conferencing environment based on the monitoring. For instance, the data collected during monitoring can be analyzed by monitoring device 100 to detect the issue. In some instances, an application can be run on monitoring device 100 to facilitate the analysis.

An example of issue detection can include monitoring device 100 analyzing data received from data collection devices about positions of participants and sounds in the conferencing environment during monitoring and analyzing. Based on the monitoring, monitoring device 100 can detect an audio issue with the conferencing environment and/or session. For instance, monitoring device 100 can detect that participants are affecting a teleconference by speaking from a corner of a room and that a conferencing session may be negatively impacted.

At 110, monitoring device 100 can comprise processor 114 to determine a correction for the issue in response to the detection and at 108, monitoring device 100 can comprise processor 114 to perform the correction. In some instances, performing the correction can include providing a recommendation or instructions to conferencing device 102 or conferencing session participants to perform the correction (e.g., via a user interface). For instance, a correction recommendation can be sent to a participant's laptop computer, via a user interface on conferencing device 102, and/or via a user interface on monitoring device 100, among others.

In some examples, performing the correction can include instructing conferencing device 102 to adjust a parameter in a voice processing model. For instance, if a microphone communicatively coupled to monitoring device 100 detects an issue with a sound in the conferencing environment causing clarity issues that data can be received at monitoring device 100, and monitoring device 100 can instruct conferencing device 102 to adjust a parameter in a voice processing model of the conferencing device to improve the clarity of the conferencing session.

In the previously presented example that included monitoring device 100 detecting an issue associated with positions and sounds of participants in the conferencing environment, determining a correction can include determining an adjustment to be made to conferencing device 102, to data collection devices (e.g., turn off or adjust microphones), or to positions of the participants. Correction can include monitoring device 100 instructing conferencing device to make such an adjustment or recommending the participants change position in the conferencing environment, for instance. The recommendation to the participants can include, for example, monitoring device 100 displaying the recommendation via a user interface (e.g., on monitoring device 100, on conferencing device 102, or elsewhere in the conferencing environment) and/or a visual cue, among other recommendation types.

Monitoring device 100 can run an application to analyze the data received to determine a quality of a conferencing session (e.g., call quality) and/or the conferencing environment and to facilitate communication between the conferencing device 102 and monitoring device 100. In some examples, conferencing device 102 can run a version of the application in addition to and simultaneously with monitoring device 100. Having the application (or some version) running on monitoring device 100 and conferencing device 102 can, in some instances, facilitate improved communication between monitoring device 100 and conferencing device 102.

Figure 2:
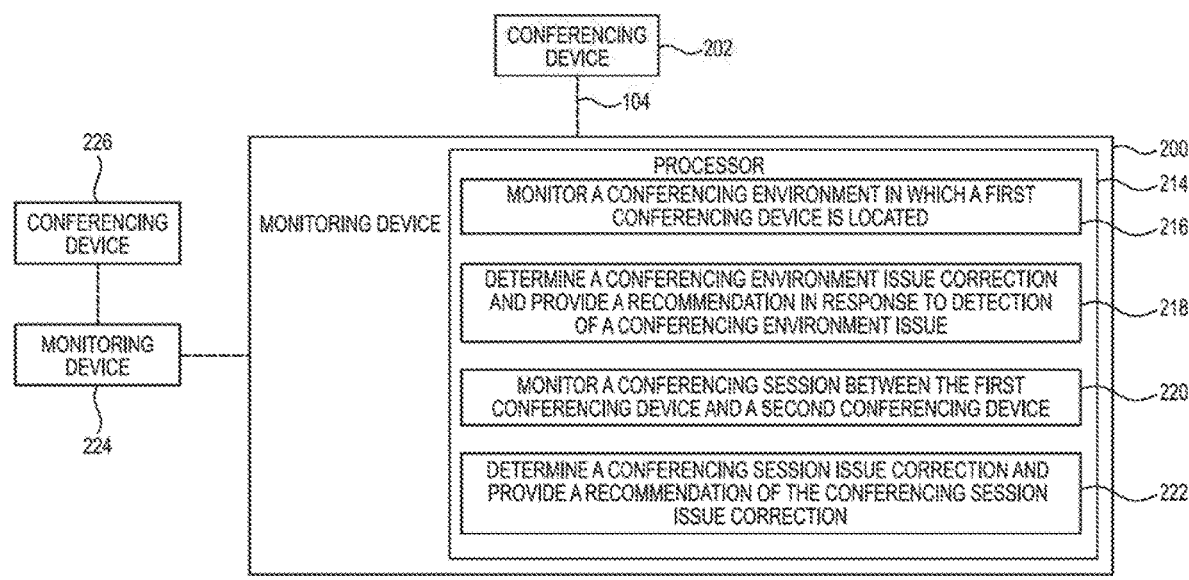
FIG. 2 illustrates a monitoring device to monitor a conferencing environment according to another example.

FIG. 2 illustrates a monitoring device to monitor a conferencing environment according to another example. Monitoring device 200 can include a processor 214. Monitoring device 200 and/or processor 214 can be akin to monitoring device 100 and/or processor 114, respectively, as described with respect to FIG. 1. Monitoring device 200 can be communicatively coupled to a conferencing device 202 akin to conferencing device 102 and a different monitoring device 224 having a different conferencing device 226 communicatively coupled thereto. In some examples, monitoring device 200 can be referred to as a first monitoring device, conferencing device 202 can be referred to as a first conferencing device, different monitoring device 224 can be referred to as a second monitoring device, and different conferencing device 226 can be referred to as a second conferencing device.

In the example illustrated in FIG. 2, monitoring device 200 and conferencing device 202 can be located in a different location than different monitoring device 224 and different conferencing device 226. For instance, different conferencing device 226 may be a remote conferencing device. Such an example may include monitoring device 200 and conferencing device 202 located in a first conference room and different monitoring device 224 and different conferencing device 226 located in a second conference room.

A conferencing session may occur between conferencing device 202 and different conferencing device 226. In such an example, monitoring device 200 and different monitoring device 224 can each monitor their respective conferencing environments, while both can monitor the conferencing session. For instance, monitoring device 200 may detect an issue with the conferencing session that different monitoring device 226 does not detect. Such an issue can be communicated to different conferencing device 226 for correction.

At 216, monitoring device 200 can comprise processor 214 to monitor a conferencing environment in which conferencing device 202 is located. For instance, monitoring device 200 can use a camera, microphone, and/or a sensor, among other data collection devices communicatively coupled to monitoring device 200 to monitor its associated conferencing environment including a conferencing session in which it is associated.

At 218, monitoring device 200 can comprise processor 214 to determine a conferencing environment issue correction and provide a recommendation of the conferencing environment issue correction to conferencing device 202 in response to detection of a conferencing environment issue impacting a conferencing session between conferencing device 202 and different conferencing device 226. In some instance, a recommendation can be made to conferencing session participants or another person in the conferencing environment.

As an example, monitoring device 200 can receive data from a camera and/or thermal detector that an obstruction (e.g., a laptop computer) is located in front of conferencing device 202. In such an example, monitoring device 200 can turn up a microphone communicatively coupled to monitoring device 200 and/or instruct conferencing device 202 to adjust a parameter in a voice processing model of conferencing device 202 or turn up a microphone of conferencing device 202 to compensate for the blocked conferencing device 202. Additionally or alternatively, monitoring device 200 can provide a recommendation for a participant to physically move the obstruction, for example.

At 220, monitoring device 200 can comprise processor 214 to monitor the conferencing session between conferencing device 202 and different conferencing device 226. For instance, different conferencing device 226 can be a remote conferencing device such as a landline telephone located in a remote location. For instance, monitoring device 200 can detect that different conferencing device 226 is sending conferencing device 202 noise content (e.g., a heating, ventilation, and air condition (HVAC) duct directly over different conferencing device 226 causing noise) rather than voice content. In such an example, different conferencing device 226 or different monitoring device 224 may not detect the impact of the noise content to the conferencing session, for instance an impact to a call quality coming out of conferencing device 202. Monitoring device 200 can provide a recommendation to different monitoring device 224 to correct the issue. For instance, monitoring device 200 may share a "too much noise" message to different monitoring device 224 and recommend taking action to correct the issue. For example, different monitoring device 224 may instruct different conferencing device 226 to turn down microphones or may notify participants to move the different conferencing device 226 away from the HVAC duct.

At 222, monitoring device 200 can comprise processor 214 to determine a conferencing session issue correction and provide a recommendation of the conferencing session issue correction to the different monitoring device in response to detection of a conferencing session issue impacting the conferencing session. For instance, in the example discussed above, monitoring device 200 can provide a recommendation to different monitoring device 224 to physically move different conferencing device 226 away from a cause of the noise content. Alternatively or additionally, monitoring device 200 can instruct conferencing device 202 to adjust a parameter in a voice processing algorithm to compensate for the noise content.

In some embodiments, monitoring device 200 can run an application to facilitate communication between monitoring device 200 and the different monitoring device 224 and between monitoring device 200 and conferencing device 202. In some examples, the application can run on the different monitoring device 224, the conferencing device 202, and the different conferencing device 226 (e.g., to facilitate communication between conferencing device 226 and monitoring device 224).

Figure 3:
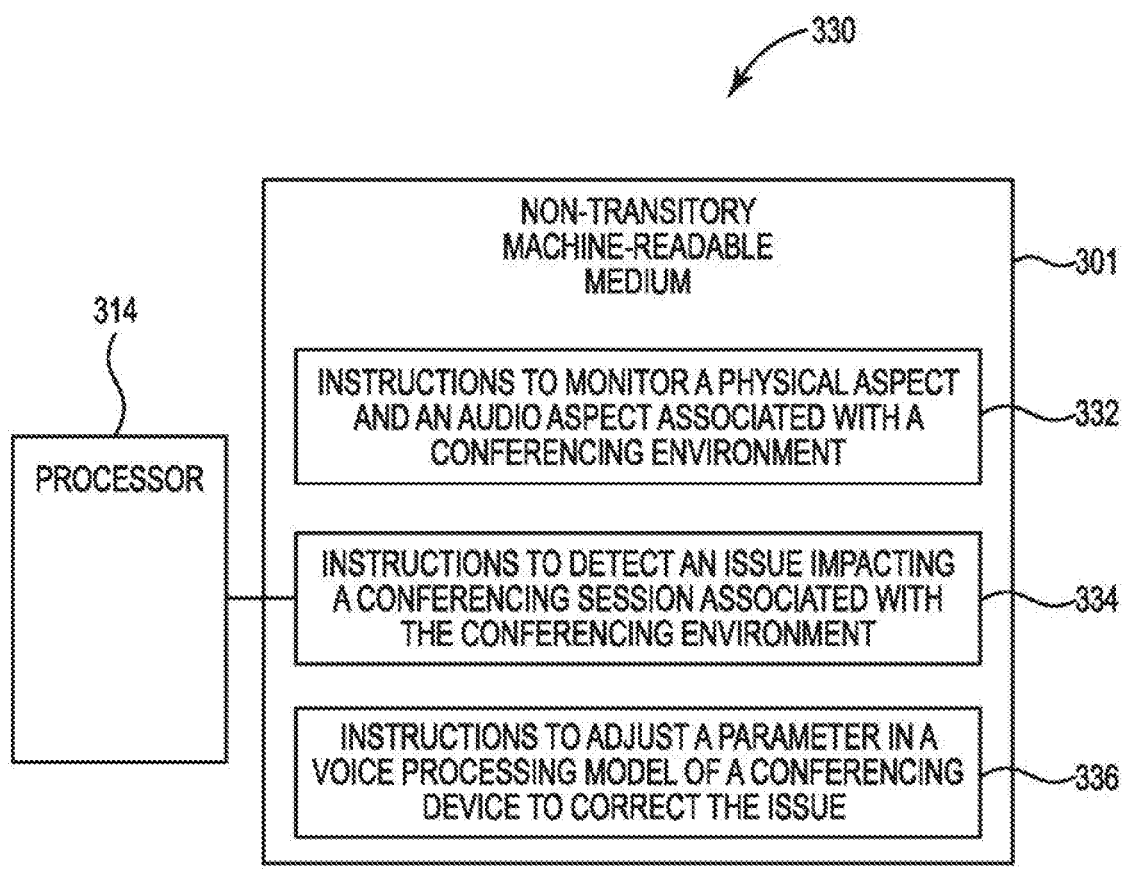
FIG. 3 illustrates a system 330 to monitor a conferencing environment according to an example.

FIG. 3 illustrates a system 330 to monitor a conferencing environment according to an example. System 330 can be a monitoring device akin to monitoring device 100 as illustrated in FIG. 1 and monitoring device 200 as illustrated in FIG. 2.

System 330 can be a computing device in some examples. For example, system 330 can include a processor 314. System 330 100 can further include a non-transitory machine readable medium 301, on which may be stored instructions, such as instructions 332, 334, 336. Although the following descriptions refer to a processor and a memory, the descriptions may also apply to a system with multiple processors and multiple memories. In such examples, the instructions may be distributed (e.g., stored) across multiple non-transitory machine readable mediums and the instructions may be distributed (e.g., executed by) across multiple processors.

Processor 314 can be a central processing unit (CPU), a semiconductor based microprocessor, and/or other hardware devices suitable for retrieval and execution of instructions stored in non-transitory machine readable medium 301. Processor 314 can fetch, decode, and execute instructions 332, 334, 336, or a combination thereof. As an alternative or in addition to retrieving and executing instructions, processor 314 can include at least one electronic circuit that includes electronic components for performing the functionality of instructions 332, 334, 336, or a combination thereof.

Non-transitory machine readable medium 301 may be electronic, magnetic, optical, or other physical storage device that stores executable instructions. Thus non-transitory machine readable medium 301 may be, for example, Random Access Memory (RAM), an Electrically-Erasable Programmable Read-Only Memory (EEPROM), a storage drive, an optical disc, and the like on-transitory machine readable medium 301 may be disposed within system 330, as shown in FIG. 3. In this example, the executable instructions 332, 334, 336 may be "installed" on the device. Additionally and/or alternatively, non-transitory machine readable medium 301 can be a portable, external or remote storage medium, for example, that allows system 330 to download the instructions 332, 334, 336 from the portable/external/remote storage medium. In this situation, the executable instructions may be part of an "installation package". As described herein, non-transitory machine readable medium 301 can be encoded with executable instructions for conferencing environment monitoring.

Instructions 332, when executed by a processor such as processor 314, can include instructions to monitor using a camera and a microphone, a physical aspect and an audio aspect associated with a conferencing environment. Monitoring can include, for instance, using cameras, microphones, sensors, and/or other data collection devices to monitor characteristics of the conferencing environment.

In some instances, the monitoring can include continuous monitoring of the physical aspects and audio aspects associated with the conferencing environment. As used herein, "continuous" monitoring can include monitoring the conferencing environment as it changes (e.g., a new object is introduced, etc.). For example, a quality of the conferencing environment can be determined as the quality or the conferencing environment changes.

Continuous monitoring can include, for instance, the monitoring device monitoring as a conferencing session occurs. For example, if a participant joins the conferencing session late, the monitoring device can monitor doors opening and closing, locations of participants changing, noise changes, obstructions being introduced, etc. Continuous monitoring can allow for corrections and/or recommendations to be made as the conferencing session happens.

Instructions 334, when executed by a processor such as processor 314, can include instructions to detect an issue associated with the conferencing environment based on the monitoring. In some examples, the issue can be detected based on data received from a sensor within the conferencing environment. For instance, a participant may block a microphone used for a conferencing session. A sensor communicatively coupled to the monitoring device may collect this data and communicate it to the monitoring device. The monitoring device can detect this as an issue. In some instances, detection can occur in real-time in response to continuous monitoring.

The issue, in some examples, can be communicated via the monitoring device to the conferencing device, and instructions 336, when executed by a processor such as processor 314, can include instructions to adjust a parameter in a voice processing model of a conferencing device communicatively coupled to the monitoring device to correct the issue. For instance, the aforementioned microphone issue can be communicated to the conferencing device, and the monitoring device can adjust a parameter in a voice processing model of the conferencing device or instruct the conferencing device to adjust the parameter to compensate for the microphone issue.

In some examples, correcting the issue can include recommending to conferencing session participants to make a change to the conferencing device or in the conferencing environment. For instance, the monitoring device can provide a recommendation via user interface to correct the issue and/or via an audio alert such as an alarm or voice instructions. In the aforementioned example, this may include a recommendation for the participant to physically move to avoid blocking the microphone.

Figure 4:
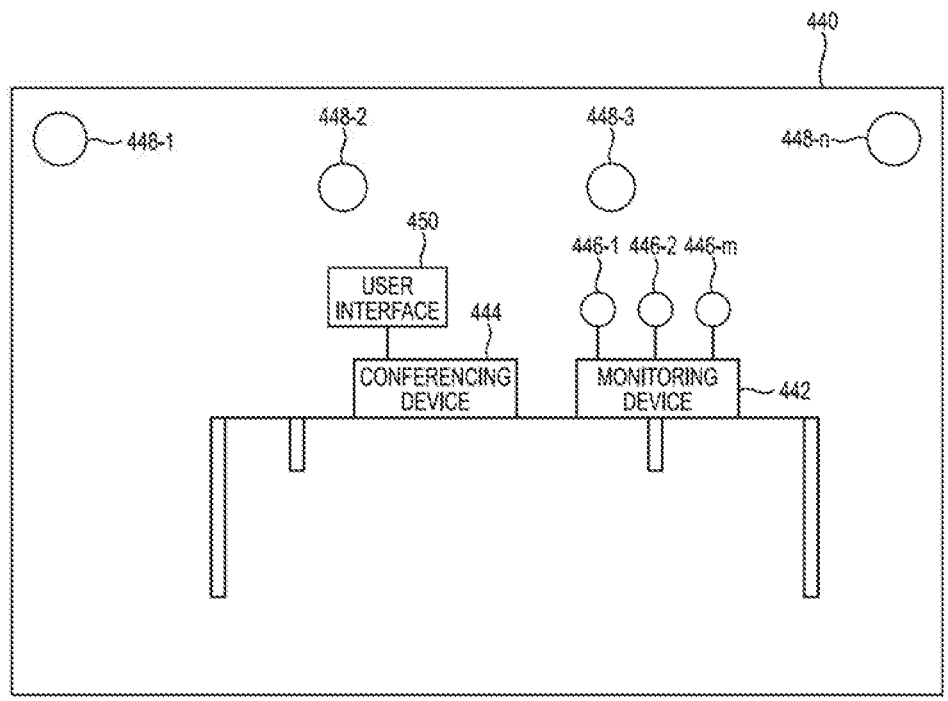
FIG. 4 illustrates a diagram of a monitoring device within a conferencing environment according to an example.

FIG. 4 illustrates a diagram of a monitoring device 442 within a conferencing environment 440 according to an example. Conferencing environment 440 can include a conference room, for instance, and can be communicatively coupled to a conferencing device 444 having a user interface 450 and a plurality of data collection devices 448-1, 448-2, 448-3, . . . , 448-n (referred to herein after as data collection devices 448). Data collection devices 448 can include cameras, sensors, microphones, thermal detectors, or other devices that can capture aspects of conferencing environment 440 and/or a conferencing session held on conferencing device 444.

Monitoring device 442 can be located in a plurality of locations of conferencing environment 440. While monitoring device 442 is illustrated on a conference table in FIG. 4, locations of monitoring device 442 are not so limited. In some examples, monitoring device 442 can include data collection devices 446-1, 446-2, . . . , 446-m (referred to herein after as data collection devices 446). Data collection devices 448 can include cameras, sensors, microphones, thermal detectors, or other devices that can capture aspects of conferencing environment 440 and/or a conferencing session held on conferencing device 444. Monitoring device 442, in some instances, can include a user interface (not illustrated in FIG. 4).

In some examples monitoring device 442 can monitor conferencing environment 440 and can detect and correct issues associated with conferencing environment 440. For instance, using data received from devices 446 and 448 during monitoring, monitoring device 442 can detect an issue that can negatively impact a conferencing session and correct the issue. Correction can include directly fixing the issue and/or providing a recommendation for correction. For instance, if a participant blocks conferencing device 444 with a laptop, monitoring device 442 can communicate to the participant via a user interface on the laptop to physically move the laptop. In such an example, the participant may be running an application on the laptop that is also run on monitoring device 442 and/or the laptop and monitoring device 442 may be on a same network.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature may refer to one or more of such elements and/or features.

What is claimed:

1. A monitoring device comprising:
a processor to:
monitor a physical aspect and an audio aspect of a conferencing environment in which a conferencing device is located, wherein the conferencing device is communicatively coupled to the monitoring device;
detect, based on the monitoring, a plurality of issues impacting a conferencing session associated with the conferencing device and the conferencing environment,
wherein one of the plurality of issues is a position of an obstruction in the conferencing environment, a spatial relationship of the obstruction to the conferencing device, or both;
in response to the detection, determine a correction for one of the plurality of issues; and
perform the correction.

2. The device of claim 1, wherein the monitoring device is communicatively coupled to a sensor to monitor the physical aspect and the audio aspect.

3. The device of claim 1, wherein the monitoring device is communicatively coupled to a camera to monitor the physical aspect and the audio aspect.

4. The device of claim 1, wherein the monitoring device is communicatively coupled to a microphone to monitor the audio aspect.

5. The device of claim 1, further comprising an application executing on the monitoring device to facilitate communication between the conferencing device and the monitoring device.

6. The device of claim 1, wherein the monitoring device is to perform the correction by providing a correction recommendation via a user interface to correct the issue.

7. The device of claim 1, wherein the monitoring device is to perform the correction by instructing the conferencing device to adjust a parameter in a voice processing model of the conferencing device.

8. The device of claim 1, wherein the monitoring device is to perform the correction by providing a recommendation to physically move the obstruction.

9. A first monitoring device comprising:
a processor to:
monitor a conferencing environment in which a first conferencing device is located, wherein the first conferencing device is communicatively coupled to the first monitoring device;
in response to detection of a conferencing environment issue impacting a first conferencing session between the first conferencing device and a second conferencing device, determine a conferencing environment issue correction and provide a recommendation of the conferencing environment issue correction to the first conferencing device;
monitor the conferencing session, wherein the second conferencing device is communicatively coupled to a second monitoring device and the second monitoring device is communicatively coupled to the first monitoring device; and
in response to detection of a conferencing session issue impacting the conferencing session, determine a conferencing session issue correction and provide a recommendation of the conferencing session issue correction to the second monitoring device.

10. The device of claim 9, further comprising the first monitoring device to monitor the conferencing environment using a camera, a microphone, and a sensor communicatively coupled to the first monitoring device.

11. The device of claim 9, wherein the first monitoring device executes an application to facilitate communication between:
the first monitoring device and the second monitoring device; and
the first monitoring device and the first conferencing device.

12. A non-transitory machine readable medium comprising instructions executable by a processor of a first monitoring device to:
monitor, using a camera and a microphone, a physical aspect and an audio aspect associated with a conferencing environment in which a first conferencing device is communicatively coupled to the first monitoring device is located;
in response to detection of an issue during the monitoring and impacting a conferencing session between the first conferencing device and a second conferencing device and associated with the conferencing environment, adjust a parameter in a voice processing model of the first conferencing device to correct the issue,
monitor the conferencing session, wherein the second conferencing device is communicatively coupled to a second monitoring device, and the second monitoring device is communicatively coupled to the first monitoring device; and
in response to detection of a conferencing session issue impacting the conferencing session, determine a conferencing session issue correction and provide a recommendation of the conferencing session issue correction to the second monitoring device.

13. The medium of claim 12, further comprising instructions executable to detect the issue associated with the conferencing environment based on data received from a sensor within the conferencing environment.

14. The medium of claim 12, further comprising instructions executable to provide a recommendation via a user interface to correct the issue associated with the conferencing environment, the conferencing session issue, or both.

15. The medium of claim 12, further comprising instructions executable to communicate the issue associated with the conferencing environment, the conferencing session issue, or both to the conferencing device.

16. The medium of claim 12, further comprising instructions executable to continuously monitor the physical aspect and the audio aspect associated with the conferencing environment.

* * * * *